United States Patent [19]

Atal

[11] E Patent Number: Re. 32,124

[45] Reissued Date of Patent: Apr. 22, 1986

[54] PREDICTIVE SIGNAL CODING WITH PARTITIONED QUANTIZATION

[75] Inventor: Bishnu S. Atal, New Providence, N.J.

[73] Assignee: AT&T Bell Laboratories, Murray Hill, N.J.

[21] Appl. No.: 660,494

[22] Filed: Oct. 12, 1984

Related U.S. Patent Documents

Reissue of:

[64] Patent No.: 4,354,057
Issued: Oct. 12, 1982
Appl. No.: 138,281
Filed: Apr. 8, 1980

[51] Int. Cl.[4] ..... G10L 1/00

[52] U.S. Cl. ..... 381/36

[58] Field of Search ..... 370/81; 375/28, 30, 375/31; 333/14; 381/29-53

[56] References Cited

U.S. PATENT DOCUMENTS

| | | | |
|---|---|---|---|
| 3,502,986 | 3/1970 | Lucky | 325/38 |
| 3,631,520 | 12/1971 | Atal | 179/1 SA |
| 3,750,024 | 7/1973 | Dunn et al. | 179/15.55 R X |
| 4,005,274 | 1/1977 | Vagliani et al. | 179/15.55 R |
| 4,133,976 | 1/1979 | Atal | 179/1 P |
| 4,179,710 | 12/1979 | Ishigurd et al. | 179/15.55 R |

*Primary Examiner*—E. S. Matt Kemeny
*Attorney, Agent, or Firm*—Jack S. Cubert

[57] ABSTRACT

In a communication system an input predictive type signal is analyzed in successive time intervals to generate a set of prediction signals for the interval. A predictive residual signal is produced jointly responsive to the input signal and the interval prediction signals. The predictive residual signal is quantized and encoded. The quantization includes dividing the predictive residual signal into a plurality of distinct portions and selectively quantizing the distinct portions to improve intelligibility.

10 Claims, 8 Drawing Figures

PREDICTIVE SIGNAL CODING WITH PARTITIONED QUANTIZATION

Matter enclosed in heavy brackets [ ] appears in the original patent but forms no part of this reissue specification; matter printed in italics indicates the additions made by reissue.

BACKGROUND OF THE INVENTION

This invention relates to speech signal communication systems and more particularly to digital speech signal processing adapted to reduce transmission rates.

The processing of signals for transmission over digital channels in telephone and other types of communication systems generally includes the sampling of the input signals, quantization of the samples, and generation of a set of codes representative of the quantized signal samples. As is well known, speech signal samples are highly correlated so that each signal sample has a component that is predictable from its past values. The predictable and unpredictable components of the speech signal can be separated and encoded at approximate rates to provide efficient utilization of a digital channel without affecting the subjective quality of the speech signal.

Predictive signal arrangements as disclosed in U.S. Pat. Nos. 3,502,986 and 3,631,520 involve generation of predictive parameter signals from the succession of speech samples and the formation of a predicted value for each speech signal sample from the generated parameters and the preceding speech signal samples. The difference between each sample and its predicted value is quantized, digitally encoded, and sent to a receiver along with the predictive parameters. The difference signal is encoded at the receiver and combined with the predictive parameters and other signal information already stored in the receiver. In this manner, only the unpredicted signal component need be quantized and transmitted at a high bit rate and a saving in channel capacity is achieved. The saving is generally reflected in the reduced bit rate needed to transmit a signal of predetermind quality.

U.S. Pat. No. 4,133,976 issued Apr. 7, 1978 to B. S. Atal and M. R. Schroeder and assigned to the same assignee discloses a predictive speech signal coding arrangement in which a set of formant-related predictive parameters corresponding to the short-term redundant structure of the speech signal and a set of pitch-related prediction parameters corresponding to the long-term redundant structure of the speech signal are generated. Since the speech signal is quasi-stationary, the prediction parameters need only be generated once every 10 milliseconds. The remaining portion of the speech signal corresponds to the unpredicted component generally termed the prediction residual.

While the prediction parameter signals representative of the predictive speech signal component can be transmitted at a relatively low bit rate without adverse effects, the transmission rate of the prediction residual is critical to the quality of the reconstructed speech signal. Typically, the predicted signal component parameters require a transmission rate of 3 to 4 kilobits per second. At total bit rates lower than 10 kilobits per second, it is often necessary to quantize the prediction residual with only one bit per sample. This two level quantization results in both peak-clipping of the prediction residual and granular distortion. It is an object of the invention to provide improved digital speech communication at low bit rates.

BRIEF SUMMARY OF THE INVENTION

The invention is directed to a predictive speech signal communication arrangement in which an input signal is analyzed in successive time intervals to generate a set of prediction parameter signals for each interval. Jointly responsive to the input signal and the prediction parameter signals, a signal representative of the prediction residual is produced. A quantized signal corresponding to the prediction residual is generated and encoded for transmission over a digital channel. The quantized signal generation includes partitioning the prediction residual signal into a plurality of distinct portions and selectively quantizing the distinct portions of the prediction residual signal.

DETAILED DESCRIPTION

Figure 1:
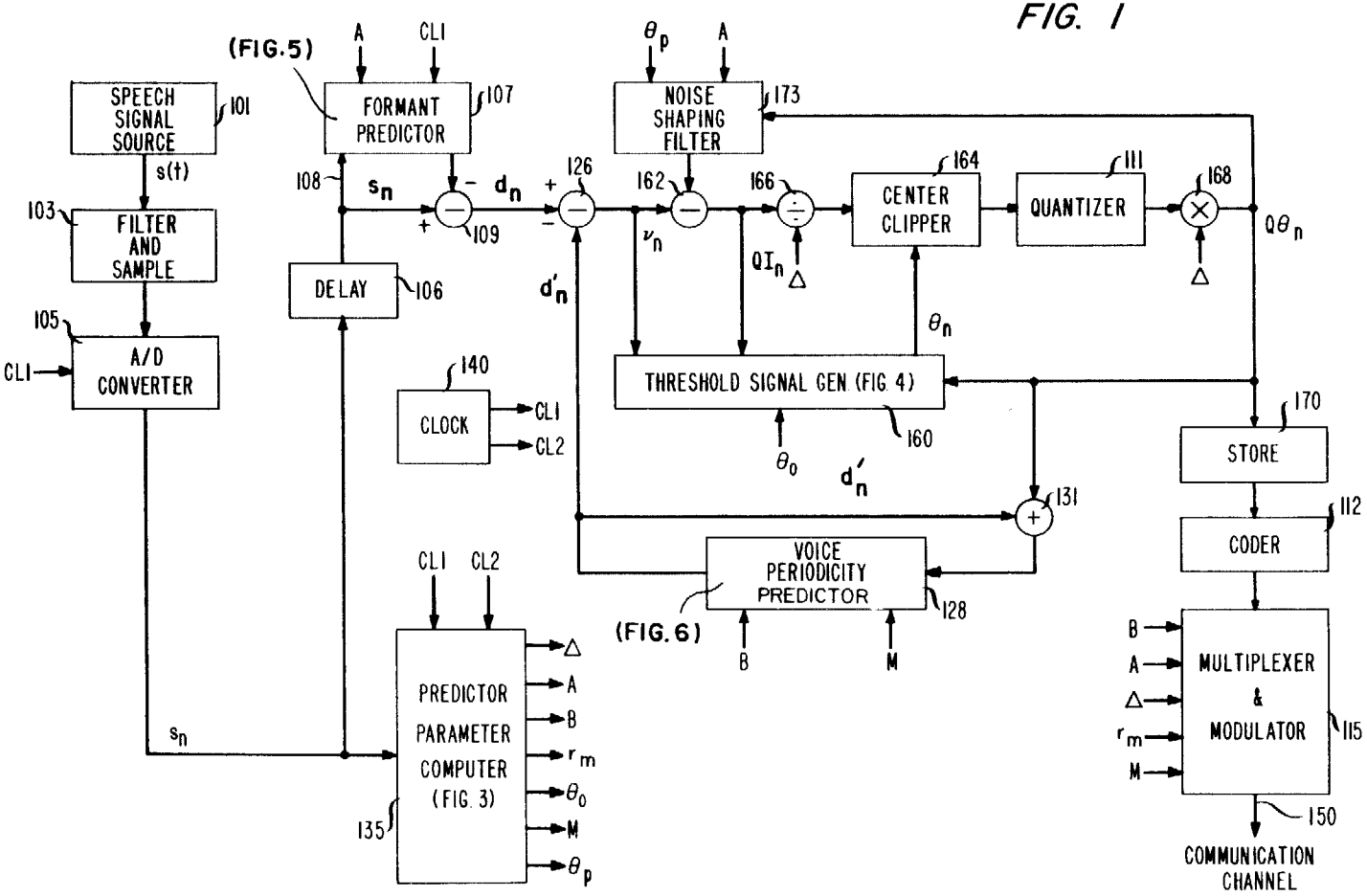
FIG. 1 depicts a block diagram of a digital speech signal coding circuit illustrative of the invention.

FIG. 1 depicts a predictive speech signal coder illustrative of the invention. In FIG. 1, a speech signal s(t)from speech signal source 101 is supplied to filter and sampler circuit 103. Signal s(t) is low-pass filter and modified by a high frequency emphasis arrangement in circuit 103 and is then sampled at a predetermined rate. Circuit 103 may comprise a low-pass filter with a cutoff frequency of 4 kilohertz, a preemphasis netowrk with a +6 db per octave slope beginning at 700 hertz, and a sampler having a sampling rate of 8 kilohertz. The successive signal samples from circuit 103 are applied to analog-to-digital converter 105. In the A-to-D converter, a digital code $s_n$ suitable for use in the encoder is produced for each signal sample.

The coded signal samples $s_n$ from converter 105 are sequentially applied to one input of predictive parameter computer 135. The $s_n$ samples are also supplied to formant predictor 107 through a delay 106 and lead 108. Delay 106 may comprise a shift register or other delay elements well known in the art. Predictor 107 is responsive to the code samples $s_n$ from delay 106 and the prescribed set of predictive signals $A = a_1, a_2, \ldots a_k, \ldots a_p$ obtained from computer 135 to generate a predictive code.

$$\sum_{k=1}^{p} s_{n-k} a_k \tag{1}$$

for each sample where $a_k$ is the $k^{th}$ linear prediction parameter coefficient and p is the order of the predictor. As is well known in the art, predictor 107 is operative to predict the present value of each signal sample $s_n$ from the weighted sum of a number of prior sample values in accordance with expression 1. The prediction is based on the short-term spectral envelope of the speech signal and the formant structure of the vocal tract as represented by the prediction parameter signals $a_1, a_2, \ldots, a_p$.

Figure 5:
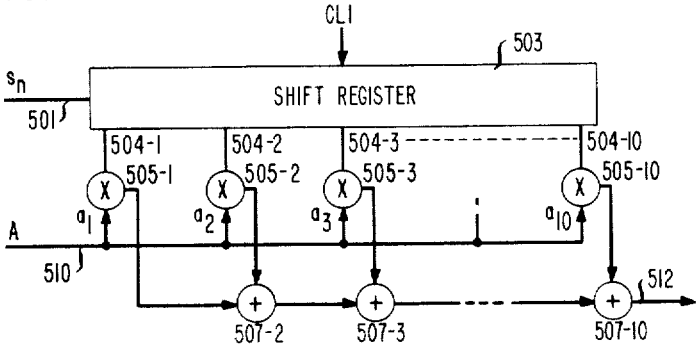
FIG. 5 shows a detailed block diagram of the formant predictor circuits of FIGS. 1 and 2.

FIG. 5 shows a tranversal filter well known in the art which may be used as formant predictor 107. The predictor of FIG. 5 is characterized in z transform notation as $$P_s(z) = \sum_{k=1}^{p} a_k z^{-k} \tag{2}$$

In FIG. 5, p is equal to 10, shift register 503 is a 10 stage register operated at an 8 kilohertz sampling rate. The sampling clock pulses CL1 are provided by clock generator 140. Register 503 receives the successive $s_n$ samples from delay 106 on line 501. The output of the first register stage on line 504-1 is supplied to one input of multiplier 505-1. In similar manner, the outputs of the remaining stages of shift register 503 on lines 504-2 through 504-10 are supplied to multiplers 505-2 through 505-10, respectively. The linear prediction coefficient signals $a_1, a_2, \ldots, a_{10}$ are applied to multipliers 505-1 through 505-10 via line 510 as indicated in FIG. 5. Each multiplier is operative to form the product $s_{n-k}a_k$. The products are summed two at a time in adders 507-2 through 507-10. The signal representative of the sum of the products in accordance with expression 1 is then available on the transverse filter output line 512.

The predicted signal from format predictor 107 is applied to the negative input of subtractor network 109 wherein it is subtracted from the current coded sample $s_n$ of the speech signal from delay 106. The resultant difference signal $$d_n = s_n - \sum_{k=1}^{p} s_{n-k}a_k \tag{3}$$

corresponds to the speech signal with its formant redundancy removed.

Voice periodicity predictor 128 is effective to remove pitch related redundancy from the speech signal whereby the prediction residual of the speech signal is further reduced. The output of quantizer 111 is supplied to adder 131. Adder 131 and voice periodicity predictor 128 are adapted to form a predicted value code $d'_n$ for each difference signal sample responsive to a set of prior difference codes $d_n$, quantizer output signals, and prediction parameter signals $B=b_1, b_2, b_3$, as well as code M representative of the pitch period of the current speech signal segment. The sum of the quantizer output signal $QO_n$ and the predicted difference signal is formed in adder 131. The sum output of adder 131 is supplied to the input of periodicity predictor 128. As described in the forementioned U.S. Pat. No. 4,133,976, predictor 128 produces a signal representative of the predicted value of the present difference signal in accordance with $$d'_n = b_1 d'_{n-m+1} + b_2 d'_{n-m+1} + g_n \tag{4}$$

The predictor is characterized in z transform notation by $$P_d = b_1 z^{-m+1} + b_2 z^{-m} + b_3 z^{-m-1} \tag{5}$$

where $z^{-m}$ represents a delay of m samples. $b_1$, $b_2$, and $b_3$ are prediction coefficient signals determined by minimizing the mean squared prediction error between the difference signal $d_n$ and its predicted value.

Signals M and $b_1$, $b_2$, and $b_3$ are produced in computer 135 for each speech signal interval. The predicted value of the current difference signal $d_n$ is subtracted from the output of subtractor 109 in subtraction network 126. In this manner the pitch period related redundancy of the speech signal is removed from the difference signal.

Figure 6:
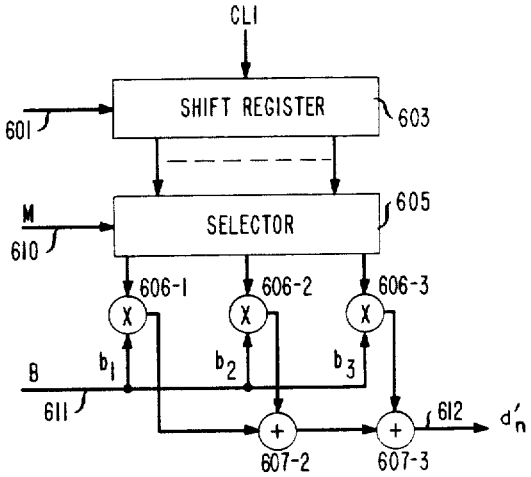
FIG. 6 shows a detailed block diagram of the voice periodicity predictors of FIGS. 1 and 2.

FIG. 6 shows an arrangement for predictor 128. In FIG. 6, shift register 603 comprises 120 stages. These stages store the successive samples received from adder 131 on line 601. The 120 stages of register 603 provide a time period of 15 milliseconds which period is the longest anticipated pitch interval in the speech signal. The output of each stage of the shift register is supplied to selector circuit 605. The selector circuit is operative to selectively gate three consecutive shift register stage outputs responsive to signal M from computer 135. The selection is done in accordance with equations 4 and 5. The output of the left-most selected shift register stage is applied to multiplier 606-1. The output of the other selected shift register stages are applied to multipliers 606-2 and 606-3 respectively. Predictive parameter signals $b_1$, $b_2$, and $b_3$ are applied to multipliers 606-1, 606-2, and 606-3 from computer 135 via line 611. The product codes from the multipliers are summed in adders 607-2 and 607-3. In this manner the predicted value code $d'_n$ for the present difference signal appears on line 612.

Prediction parameter computer 135 generates the predictive parameter signals required for the operation of the coder circuit of FIG. 1. Speech signals, as is well known in the art, are nonstationary. The characteristics of speech, however, change relatively slowly so that it is sufficient to adapt the predictive parameter signals to the changing speech signal once every 10 milliseconds at an 8 kilohertz sampling rate. Thus, prediction parameter computer 135 receives the speech samples $s_n$ from A-to-D converter 105 during each 10 millisecond time frame. Responsive to the signal samples, computer 135 provides prediction parameter and other signals for the next 10 millisecond time frame to accommodate the changing signal conditions. The signal samples $s_n$ are delayed in delay 106 so that the delay in parameter signal formation is accounted for.

Figure 3:
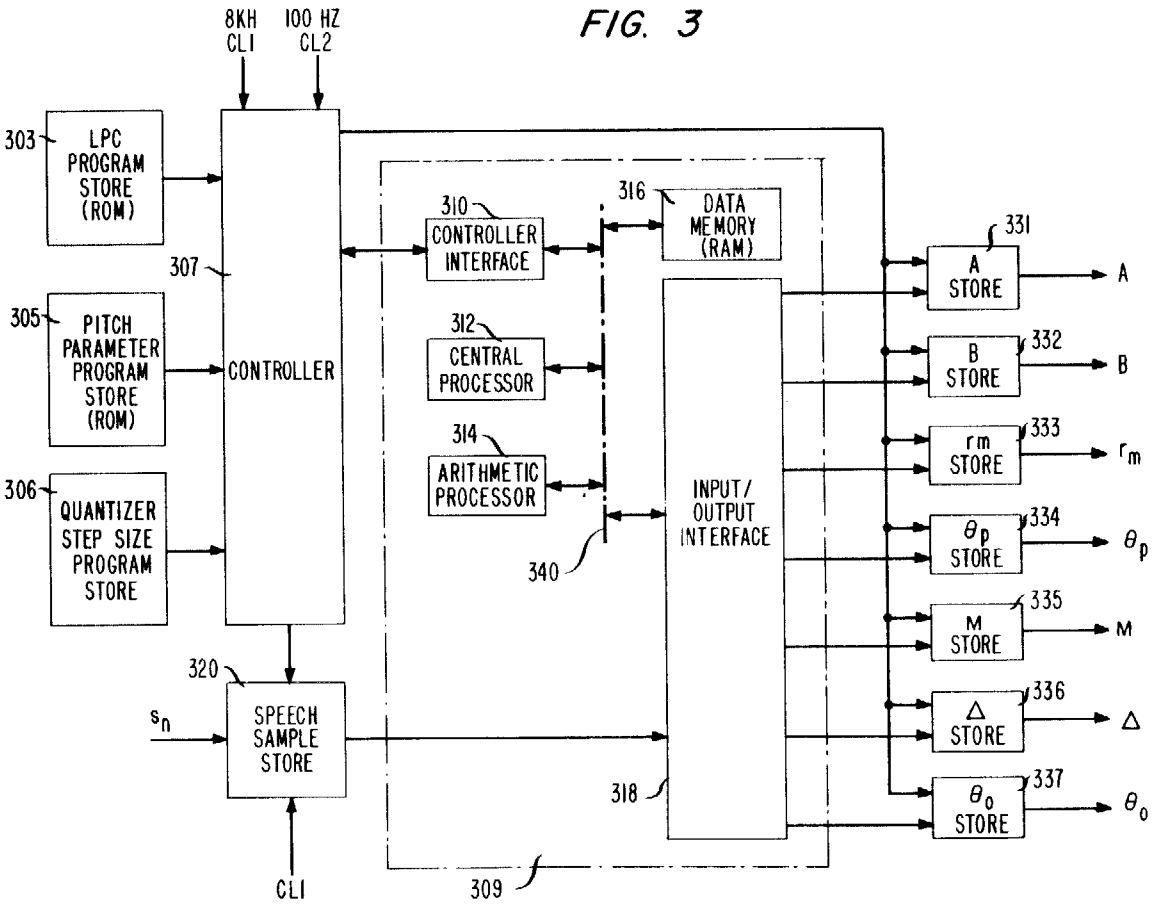
FIG. 3 depicts a detailed block diagram of the prediction parameter computer of the circuit of FIG. 1.

FIG. 3 shows a signal processing arrangement suitable for use as computer 135 in FIG. 1. Referring to FIG. 3, processor 309 is operative to generate a set of formant related linear prediction coefficient signals $a_1, a_2 \ldots, a_{10}$, a set of pitch related prediction coefficient signals $b_1$, $b_2$, $b_3$, a set of formant related partial correlation coefficient signals $r_1, r_2, \ldots, r_{10}$, a $\theta_0$ signal to control the threshold of center clipper 164, a $\theta_p$ signal for noise shaping control, a pitch related signal M, and a step-size signal $\Delta$ for use in other portions of the coder of FIG. 1. The output signals from processor 309 are stored in output stores 331 through 337. Processor 309 may be one of several microprocessor or other small size computer arrangements such as the C.S.P., Inc. Macro Arithmetic Processor System 100.

Figure 7:
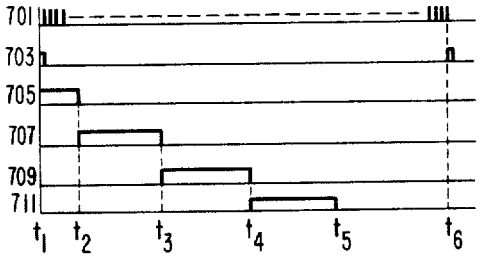
FIG. 7 shows waveforms illustrating the operation of the predictive parameter circuit of FIG. 3.

Controller 307 of FIG. 3 is adapted to partition each 10 millisecond speech frame into a sequence of predetermined time periods, each time period being dedicated to a particular operating mode. The operating modes are illustrated in FIG. 7. Clock pulses CL2 from clock 140 of FIG. 1 are shown in waveform 703. A CL3 clock pulse occurs at time $t_1$ the beginning of the 10 millisecond time frame illustrated in FIG. 7. This CL2 clock pulse places controller 307 in its data input mode until time $t_2$ as illustrated in waveform 705.

During the data input mode, controller 307 is connected to processor 309 and to speech sample store 320. Responsive to control signals from controller 307, the 80 $s_n$ sample codes inserted into sample store 320 in the immediately preceding 10 millisecond time frame are transferred to data memory 316 via input-output interface 318. The data inupt mode is terminated at time $t_2$ when 80 sample codes from store 320 have been supplied to predetermined addresses in data memory 316. While the stored 80 samples are transferred into data memory 316, the speech samples of the current frame are continually inserted into store 320 under control of clock pulse CL1.

Just after time $t_2$ controller 307 is switched to its formant prediction parameter mode as shown in waveform 707. In this formant prediction parameter mode, linear prediction coefficient (LPC) program memory 303 is connected to central processor 312 via controller 307, controller interface circuit 310 and bus 340. Responsive to the permanently stored instructions in read only memory 303, processor 309 is operative to generate formant partial correlation coefficient signals $r_m = r_1, r_2, \ldots, r_{10}$ and linear prediction coefficient signals $A = a_1, a_2, \ldots, a_{10}$. Signals A and $r_m$ are transferred to stores 331 and 333, respectively. The stored instructions for the generation of the formant predictor signals in ROM 303 are listed in FORTRAN language in Appendix 1.

As is well known in the art, these parameter signals are generated by forming the covariance matrix P whose terms are $$P_{ij} = \sum_{n=1}^{80} s_{n-i} s_{n-j} \tag{6}$$

$$i = 1,2,\ldots,10$$
$$j = 1,2,\ldots,10$$

and speech correlation factors $$c_i = \sum_{n=1}^{80} s_n s_{n-i} \tag{7}$$

$$i = 1,2,\ldots,10$$

Factors $g_1$ through $g_{10}$ are then computed in accordance with $$T \begin{bmatrix} g_1 \\ g_2 \\ \cdot \\ \cdot \\ \cdot \\ g_{10} \end{bmatrix} = \begin{bmatrix} c_1 \\ c_2 \\ \cdot \\ \cdot \\ \cdot \\ c_{10} \end{bmatrix} \tag{8}$$

where T is the lower triangular matrix obtained by the triangular decomposition of $$P = TT^t \tag{9}$$

The partial correlation coefficients $r_m$ are then generated in accordance with $$\gamma_m = \frac{g_m}{\left[ c_0 - \sum_{n=1}^{n-1} g_i \right]^{\frac{1}{2}}} \tag{10}$$

when $$c_0 = \sum_{n=1}^{80} s_n^2$$

corresponds to the energy of the speech signal in the 10 millisecond time frame. Formant linear prediction parameter signals $A = a_1, a_2, \ldots, a_{10}$ are computed from the partial correlation parameter signals $r_m$ in accordance with the recursive formulation $$a_i(m) = a_i(m-1) + r_m a_{m-i}(m-1) \tag{11}$$

$$a_0(0) = 1$$

$$i = 1,2,\ldots,m-1$$
$$m = 1,2,\ldots,10$$

The partial correlation parameter signals $r_m$, and the linear prediction parameter signals $a_i$ generated in processor 309 during the formant prediction parameter mode are transferred from data memory 316 to stores 331 and 333 for use during the next 10 millisecond time frame. The signals A are also transferred to noise shaping filter 173 in FIG. 1. During the formant prediction parameter mode, controller 307 is operative to count the CL1 clock pulses from clock 140 to determine the termination time of the mode.

At time $t_3$, after the transfer of the partial correlation and linear prediction parameter signals to stores 331 and 333, controller 307 is placed in its pitch prediction parameter mode as illustrated in waveform 709. Between times $t_3$ and $t_4$, controller 307 is operative to connect pitch prediction program memory 305 to central processor 312 via controller interface 310 and bus 340. The instruction codes permanently stored in ROM 305 are listed in FORTRAN language in Appendix 2. These instruction codes are operative to form the pitch parameter signals $b_1$, $b_2$, and $b_3$, as well as pitch-related signal M for use in voice periodicity predictor 128 of FIG. 1. Processor 309 is operative during the pitch prediction mode to determine the correlations between difference signals $d_n$ and $d_{n-i}$ over a prescribed interval as shown in Equation 12

$$\zeta = \frac{\sum_{n=1}^{80} d_n d_{n-i}}{\left[ \sum_{n=1}^{80} d_n^2 \sum_{n=1}^{80} d_{n-i}^2 \right]^{\frac{1}{2}}} \tag{12}$$

In this manner the time index i for which $\zeta_i$ is maximum is selected. M, the time at which $\zeta_i$ is maximum, is transferred from data memory 316 under control of controller 307. Processor 309 is further operative to compute pitch prediction parameters $b_1$, $b_2$, and $b_3$ on the basis of the minimization of $$\sum_{n=1}^{80} (d_n - b_1 d_{n-m+1} - b_2 d_{n-m} - b_3 d_{n-m-1})^2 \tag{13}$$

Signals M and $b_1$, $b_2$, and $b_3$ are transferred to stores 332 and 335 via input-output interface circuit 318 by time $t_4$. Between times $t_4$ and $t_5$ the signal shown in waveform 711 is enabled. Responsive to the signal of waveform 711, controller 307 is operative to connect quantizer step-size program store 306 to processor 309. In this manner, processor 309 is adapted to receive the permanently stored instruction codes of ROM 306. These instruction codes are shown in the FORTRAN language listing of Appendix 3. In the interval between times $t_4$ and $t_5$ processor 309 is operative to generate signal R in accordance with $$R = \frac{1}{80} \sum_{n=1}^{80} (d_n - b_1 d_{n-M+1} - b_2 d_{n-M} - b_3 d_{n-M-1})^2 \quad (14)$$

and to form step-size signal Δ in accordance with $$\Delta = v_{peak}/7 \quad (15)$$

where $v_{peak}$ is the peak value of the signal $d_n - b_1 d_{n-M+1} - b_2 d_{n-M-b3} d_n - M - 1$. Signals $\theta_p$ and $\theta_0$ are also formed in accordance with $$\theta_p = \theta_0 = 2R \quad (16)$$

The $\theta_p$, Δ and $\theta_0$ signals are then stored in stores 334, 336, and 337 respectively by time $t_5$. The signals from stores 331 through 337 formed during a 10 millisecond time frame are then available at the output of parameter computer 135 for the next successive time frame in the circuit of FIG. 1. The signals $s_n$ from converter 105 are simultaneously supplied to parameter computer 135 and delay 106 whereby the outputs of computer 135 are effective to control the sequence of speech samples $s_n$ from which they were formed.

The output of subtractor 126 corresponds to the speech signal with both formant and pitch period redundancies removed. Subtractor 162 is jointly responsive to the redundancy free signal from subtractor 126 and the output of noise-shaping filter 173 to provide a minimum redundancy and noise-shaped signal.

The prediction residual signal at the output of subtractor 126

$$v_n = d_{n-dn} \quad (17)$$

is modified by noise-shaping filter 173 in accordance with the arrangements disclosed in aforementioned U.S. Pat. No. 4,133,976. The output of subtractor 162, $QI_n$, is then supplied to divider circuit 166. The divider is operative to scale signal $QI_n$ by the frame step-size signal Δ from prediction parameter computer 135. After appropriate scaling the signal $QI_n$ is center clipped in center clipper circuit 164.

As a result of the center clipping, the lower amplitude samples of the prediction residual signal are replaced by zero and only the zero and the higher amplitude values of the prediction residual signal are supplied to quantizer 111. In this manner, the high amplitude portions of the prediction residual signal can be very accurately quantized while the lower amplitude portions of the prediction residual signal are replaced by zero value samples. Most of the available bits for prediction residual transmission are then utilized for the high amplitude prediction residual portions. Advantageously there is very little or no distortion produced in the communication system by the even severe center clipping of the prediction residual while the accurate quantization of the high amplitude prediction residual signal portions provides improved intelligiblity.

Threshold generator 160 receives an initial threshold value signal $\theta_0$ for the current 10 millisecond time frame from prediction parameter computer 135. The threshold value output signal $\theta_n$ which controls the center clipping thresholds of clipper circuit 164 is a function of the initial threshold value $\theta_0$, the redundancy reduced prediction residual signal $v_n$, the noise filter input to the center clipper $QI_n$, and the output samples $Q\theta_n$ from quantizer 111. The threshold value is adapted during each time frame so that only a predetermined percent γ of the prediction residual samples are supplied to quantizer 111. The samples from the center clipper can then be accurately quantized. Typically only 10 percent of the quantized prediction residual samples need be nonzero. For each 10 millisecond time frame, the initial threshold value $\theta_0$ is selected so tat it is exceeded by only 10 percent of the values of the signal $v_n$ in that frame. Threshold signal generator 160 is adapted to supply a varying $\theta_n$ signal to center clipper 164 so that the selected percentage, e.g., 10 percent of the prediction residual samples are nonzero.

Figure 4:
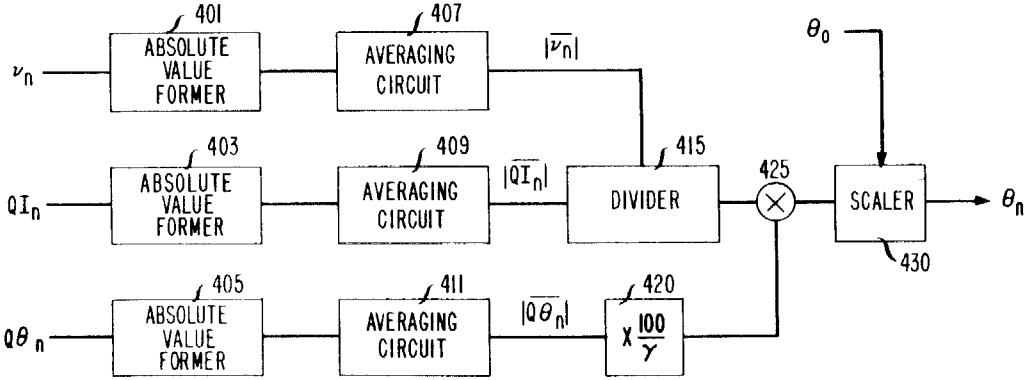
FIG. 4 shows a detailed block diagram of the threshold signal generator circuit of FIG. 1.

Threshold signal generator 160 is shown in greater detail in FIG. 4. Referring to FIG. 4, the prediction residual signal $v_n$ is supplied from subtractor 126 to absolute value former 401. The absolute value former, as is well known in the art, may comprise a sign control circuit for digital coded input signals or a full wave rectifier circuit for analog or sampled data type signals. In like manner, the signal from subtractor 162 is passed through absolute value former 403 while the signal from the output of multiplier 168 is supplied to absolute value former 405. The output of absolute former circuit 401 is averaged in averaging circuit 407 with a five millisecond time constant characteristic to form signal $\{\overline{V}_n\}$. The output of absolute value former 403 is averaged in circuit 409 with the five millisecond time constant characteristic to for signal $\{\overline{QI}_n\}$. Similarly, the signal from absolute former 405 is averaged in circuit 411 with a five millisecond time constant characteristic to form signal $\{\overline{Q\theta}_n\}$. The output of averaging circuit 409 is supplied to one input of divider circuit 415 while the output of averaging circuit 407 is supplied to the other input. Divider circuit 415 is operative to form the ratio $$\{\overline{QI}_n\}/\{\overline{V}_n\} \quad (18)$$

The signal from averaging circuit 411 is scaled by a factor of (100)/(γ) in multiplication circuit 420 and the output of scaler circuit 420 is multiplied by the ratio obtained from divider 415. The typical value of γ is 10 percent. The resultant at the output of multiplier 425 is multiplied by the initial threshold value $\theta_0$ to form the threshold signal $$\theta_n = \theta_0 \left[ \left( \frac{100}{\gamma} |\overline{Q\theta}_n| \right) (|\overline{QI}_n|/|\overline{v}_n|) \right]^{\beta} \quad (19)$$

where β is typically 0.5.

The center clipped prediction residual signal from center clipper 164 is supplied to quantizer 111 which may comprise a 15 level uniform quantizer with step size $v_{peak}/7$. As a result of the center clipping arrangements in FIG. 1 the eight innermost levels ±1, ±2, ±3, and ±4 remain zero with a very high probability. The quantizer output is constrained to have only seven levels 0, ±5, ±6, and ±7.

Figure 8:
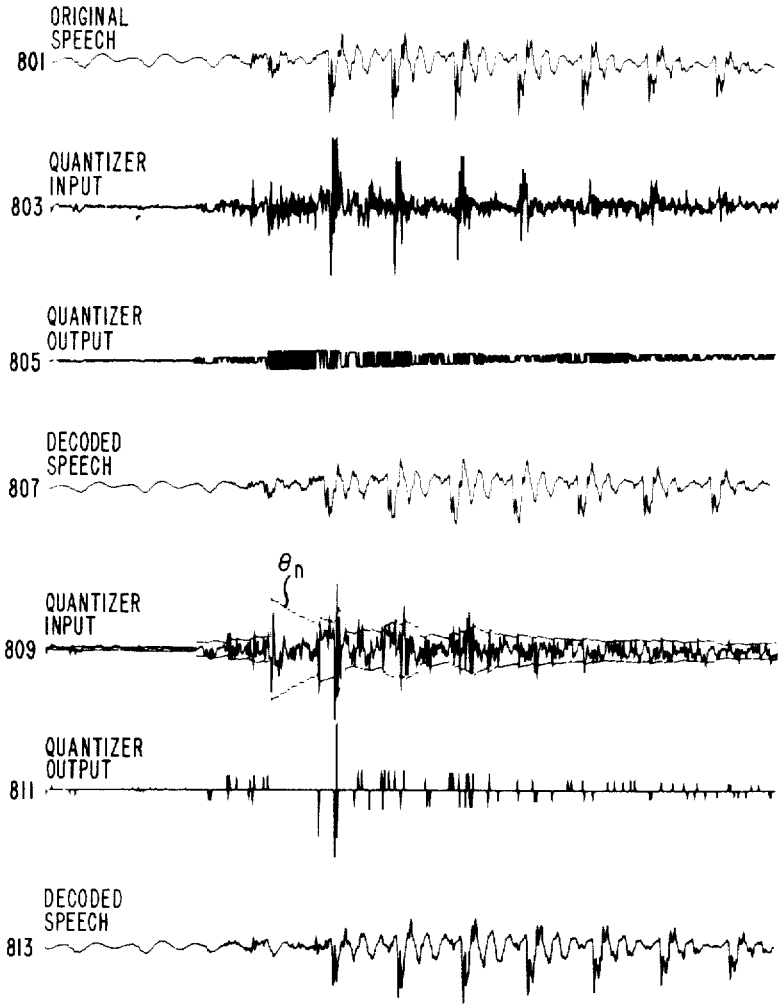
FIG. 8 shows signal waveforms illustrative of the operation of the circuit of FIG. 1.

The waveforms of FIG. 8 illustrate the effects of the adaptively controlled center clipping arrangement of FIG. 1. Waveform 801 represents speech signal s(t) after preemphasis in filter 103. Waveform 803, 805, and 807 are obtained from the arrangement of FIG. 1 in which center clipper circuit 164 and threshold signal generator 160 are removed and quantizer 111 is a two level quantizer. Such a system is typical of prior art arrangements. Waveform 803 represents the input signal to the two-level quantizer and waveform 805 is the quantized signal obtained therefrom. Waveform 807 is the decoded speech signal resulting from waveform 805. As is readily seen, it is difficult to avoid both peak clipping and granular distortion in the two-level quantizer scheme.

Waveform 809 is the output signal from subtractor 162 in FIG. 1 with the adaptive center clipping apparatus and a 15 level quantizer. The broken line in waveform 809 represents the threshold level $\theta_n$ from generator 160. Waveform 811 represents the output of quantizer 111 in FIG. 1. As is evident in waveform 811, only those portions of the signal in waveform 809 which exceed threshold level signal $\theta_n$ are accurately quantized. All other portions are replaced by zero value samples. The reconstructed speech signal derived from waveform 811 is shown in waveform 813. It is evident from waveform 813 that substantially less peak clipping and less granular distortion results from the adaptive center clipping arrangement of FIG. 1. The improved results are obtained with a reduction of step size and considerable improvement in the quality of the reconstructed speech.

The quantizer output signal obtained from multiplier 168, $QO_n$, is temporarily stored in store 170 and the prediction residual signals therefrom are converted into digital codes in coder 112. Coding arrangements such as those described in the article "On Variable Length to Block Coding" appearing in the IEEE Transactions on Information Theory Volume IT-18, pages 765–744, November 1972 by F. Jelinik and K. S. Schneider or in the article "A 9.6/16 KB/S Speech Digitizer" by S. U. H. Qureshi and G. D. Forney, Jr. appearing in the Conference Record of the International Conference on Communications, pages 30–31, 30–36, June 1975 may be used. The output of coder 112 corresponds to the prediction residual component of the speech signal from signal source 101. Multiplexer and modulator circuit 115 is adapted to assemble the codes from coder 112 and the parameter outputs of predictor computer 135 into a combined signal set and to supply the signal set in appropriately modulated form to communication channel 150.

Figure 2:
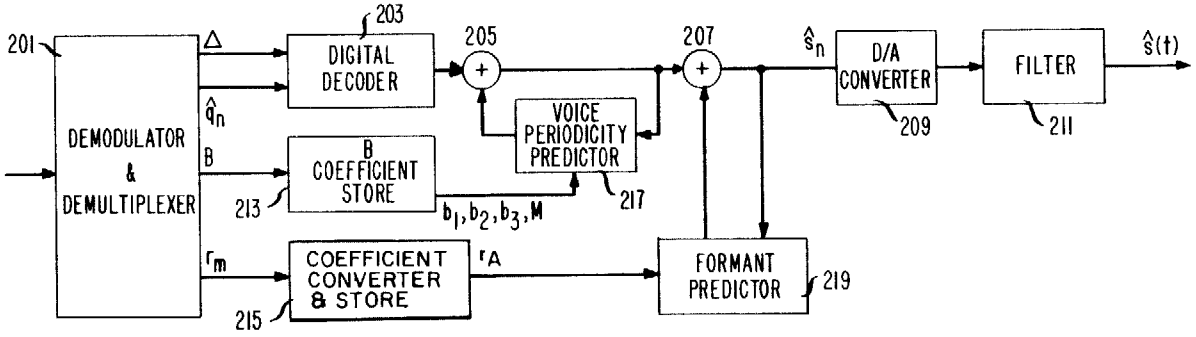
FIG. 2 depicts a block diagram of a digital speech signal decoding circuit useful in conjunction with the circuit of FIG. 1.

The decoder circuit shown in FIG. 2 receives the transmission from communication channel 150 and is operative to form a replica of the speech signal s(t). In FIG. 2, modulator and demultiplexer circuit 201 is responsive to the signals received from communication channel 150 to provide the quantized prediction residual signal $q_n$ and step size signal $\Delta$ to digital decoder 203. The digital decoder, as is well known in the art, causes signal $q_n$ to be scaled by step size signal $\Delta$. The scaled quantized prediction residual signal is applied to one input of adder circuit 205. The other input to the adder circuit is provided by voice periodicity predictor 217.

The pitch related parameter signals $B=b_1, b_2, b_3$, and M from demultiplexer and demodulator 201 for each 10 millisecond time frame are stored in B coefficient store 213. These signals are then supplied to voice periodicity predictor 217. Predictor 217 is substantially identical to predictor 128 of FIG. 1 as shown in FIG. 6. Responsive to the sequence of signal codes from adder 205 and prediction parameter signals $b_1, b_2, b_3$, and M from store 213, predictor 217 adds the pitch related predicted component of the speech signal to the prediction residual from decoder 203. The resulting excitation signal from adder 205 is then applied to one input of adder 207. The other input of adder 207 is obtained from formant predictor 219.

The parcor parameter signals $r_m$ for each 10 millisecond time frame are transferred from demultiplexer 201 to coefficient converter and store 215. The converter is adapted to transform the partial correlation parameter signals $r_m$ into linear prediction parameter signals $A=a_1, a_2, \ldots, a_{10}$. Coefficient converter 215 may comprise a signal processor such as used in computer 135 of FIG. 1 or other miniature processor arrangements well known in the art. Converter 215 forms the prediction parameter signals $a_1, a_2, \ldots, a_{10}$ from the partial correlation signals $r_m$ in accordance with the recursive formulation of equation 11. Signals $r_m$ are transmitted over channel 150 because, as is well known in the art, improved signal stability results.

Formant predictor 219 is identical to predictor 107 of FIG. 1 shown in detail in FIG. 5. Responsive to the excitation signals from adder 207 and the formant prediction parameter signals $a_1, a_2, \ldots, a_{10}$ from converter 215, the formant predictor generates the predicted formant component of the speech signal. Consequently, the output of adder 207 corresponds to the sequence of signals codes [ *n which codes form a replica of the signal codes sn* in] *n which form a replica of the signal signal codes $S_n$ in* the circuit of FIG. 1. The adder circuit is supplied to digital-to-analog converter circuit 209. The analog signal from converter 209 is then filtered in filter 211 so that components above 4 kilohertz are removed. The output of filter 211 is an analog replica signal (t).

The invention has been described with reference to an illustrative embodiment thereof. It is to be understood that various modifications may be made by one skilled in the art without the departing from the spirit and scope of the invention.

APPENDIX 1

```
C+++++   GENERATE LPC PARAMETERS
         SUBROUTINE LPCPAR
         COMMON/BIKSIG/S(81),X(90),D(200),V(80),E(91),Y(90)
         COMMON/PBKPAR/R(10),A(10),B(3),M
         COMMON/BLKSCR/P(10,10),T(10,10),C(10),Q(10),W(10)
C+++++   X(1)...X(90) ARE SPEECH SAMPLES
C+++++   X(1)...X(10) ARE SAMPLES FROM THE PREVIOUS FRAME
C+++++   X(11)...X(90) ARE SAMPLES FROM THE CURRENT FRAME
C+++++   COMPUTE ENERGY OF SPEECH SAMPLES
C+++++   ENERGY = PX
         CALL INPROD(X(11),X(11),80,PX)
```

APPENDIX 1-continued

```
C+++++  GENERATE SPEECH CORRELATION COEFFICIENTS C(1)...C(10)
        DO 11 = 1,10
        1 CALL INPROD(X(11),X(11-1),80,C(I))
C+++++  GENERATE PARTIAL CORRELATIONS AND PREDICTOR COEFFICIENTS
        EE = PX
        DO 100 I = 1,10
C+++++  GENERATE COVARIANCE MATRIX ELEMENTS P(I,J)
        DO 20 J = I,10
        XX = 0.0
        IF (I .EQ. 1 .AND. I .EQ. J) XX = PX
        IF (I .EQ. 1 .AND. J .GT. 1) XX = C(J - 1)
        IF (I .GT. 1) XX = P(I - 1,J - 1)
        20 P(I,J) = XX + X(11 - I)*X(11 - J) - X(91 - I)*X(91 - J)
C+++++  CONVERT TO TRIANGULAR MATRIX T WHERE P = T*T (TRANSPOSE)
        DO 40 J = 1,I
        SM = P(J,I)
        K = 1
        3 IF (K .EQ. J) GO TO 4
        SM = SM - T(I,K)*T(J,K)
        K = K + 1
        GO TO 3
        4 IF (I .EQ. J)W(J) = 1/SQRT(SM)
        IF (I .NE. J)T(I,J) = SM*W(J)
        40 CONTINUE
C+++++  GENERATE PARTIAL CORRELATION B(I)
        SM = C(I)
        IF (I .EQ. 1) GO TO 5
        DO 50 J = 2,I
        50 SM = SM - T(I,J - 1)*Q(J - 1)
        5 Q(T) = SM*W(I)
        IF (I .EQ. 1) GO TO 80
        EE = EE - Q(I - 1)*Q(I - 1)
        80 R(I) = Q(I))/SQRT (EE)
C+++++  GENERATE PREDICTOR COEFFICIENTS A(1)...A(I)
        A(I) = R(I)
        IF (I .EQ. 1) GO TO 100
        K = 1
        6 IF (K .GT. I/2) GO TO 100
        TI = A(K)
        TJ = A(I - K)
        A(K) = TI + R(I)*TJ
        A(I - K) = TJ + R(I)*TI
        K = K + 1
        GO TO 6
        100 CONTINUE
C+++++  GENERATE FIRST DIFFERENCE SIGNAL
        DO 110 N = 11,90
        D(N) = X(N)
        L = N - 1
        DO 10 I = 1,10
        D(N) = D(N) + A(I)*X(L)
        10 L = L - 1
        110 CONTINUE
        RETURN
        END
        SUBROUTINE INPROD(X,Y,N,PX)
        DIMENSION Y(N),X(N)
        PX = 0.0
        DO 11 = 1,N
        1 PX = PX + X(I)*Y(I)
        RETURN
        END
```

APPENDIX 2

```
C+++++  GENERATE PITCH PREDICTOR PARAMETERS
        SUBROUTINE BCHPAR
        COMMON/BLKSIG/S(81),X(90),D(200),V(80),E(91),Y(90)
        COMMON/BLKPAR/R(10),A(10),B(3),M
        COMMON/BLKSCB/P(10,10),T(10,10),C(10),Q(10),W(10)
C+++++  COMPUTE ENERGY OF FIRST DIFFERENCE SIGNAL IN THE
        CURRENT FRAME
C+++++  ENERGY = PDO
        CALL INPROD(D(121),D(121),80,PD0)
C+++++  COMPUTE ENERGY OF PAST FIRST DIFFERENCE SIGNAL
C+++++  ENERGY = PD1
        CALL INPROD(D(81),D(81),80,PD1)
C+++++  DETERMINE LOCATION OF CORRELATION PEAK
        CORMAX = -1.1
        CORP = 1.1
        CORT = 0.0
```

APPENDIX 2-continued

```
          DO 100 I = 41,120
C+++++    GENERATE CORRELATION AT DELAY I
C+++++    CORRELATION = CORL
          CALL INPROD(D(121),D(121 - I),80(P2)
          PD1 = PD1 + (D(121 - I) + D(201 - I)*(D(121 - I) - D(201 - I))
          CORL = P2/SQRT(PD1*PD0)
C+++++    SKIP TO 10 IF NOT AT A CORRELATION PEAK
          IF(CORT LT. CORL .OR. CORT .LT. CORP) GO TO 10
C+++++    FIND CORRECT PEAK BY INTERPOLATION
          CORM = CORT + 0.125*((CORP - CORL)**2)/(2*CORT - CORP- CORL)
          IF(CORM .LT. GO TO 10
          CORMAX = CORM
          M = I - 1
          10 CORP = CORT
          CORT = CORL
          100 CONTINUE
C+++++    GENERATE B-COEFFICIENTS FOR PITCH PREDICTION
          CALL INPROD(D(121 - M),D(121 - M),80,PD)
          CALL INPROD(D)121 - M),D(122 - M),80,PD1)
          CALL INPROD(D)120 - M),D(122 - M),80,PD2)
          R1 = PD1/PD
          R2 - PD2/PD
          [CALL INPROD(D(121),D(121 - M),80,C1)]
          CALL INPROD(D(121),(D(122 - M),80,C1)
          CALL INPROD(D(121),D(121 - M),80,C2)
          CALL INPROD(D(121),D(120 - M),80,C3)
          C1 = C1/PD
          C2 = C2/PD
          C3 = C3/PD
          B1 = ((1 - R1)*(C1 + C3) + (1 - 2*R1 + R2)*C2)/(1 - 2*R1**2 + R2)
          B2 = (C1 - C3)/(1 - R2)
          B3 = (C1 + C3 - 2*B1 + C2)/(1 - 2*R1**2 + R2)
          B(1) = 0.5*(B2 + B3)
          B(3) = 0.5*(B3 - B2)
          B(2) = B1 - B(1) - B(3)
C+++++    GENERATE PITCH PREDICTED DIFFERENCE SIGNAL
          DO 110 N = 121,200
          110(V)N = D(N) - B(1)*D(N - M + 1) - B(2)*D(N - M) - B(3)*D(N - M - 1)
          RETURN
          END
          SUBROUTINE INPROD(X,Y,N,PX)
          DIMENSION Y(N),X(N)
          PX - 0.0
          DO 1I = 1,N
          1 PX = PX + X(I)*Y(I)
          RETURN
          END
          SUBROUTINE INPROD(X,Y,N,PX)
          DIMENSION Y(N),X(N)
          PX = 0.0
          DO 1I = 1,N
          1 PX = PX + X(I)*Y(I)
          RETURN
          END
```

APPENDIX 3

```
C+++  COMPUTE STEP SIZE
      SUBROUTINE STEPSZ(DELTA)
      COMMON/BLKSIG/S(81),X(90),D(200),V(80),E(91),Y(90)
      CALL PEAKVL (V,80,PEAK)
      DELTA = PEAK/7
      RETURN
      END
CPEAKVL  COMPUTE ABSOLUTE PEAK OF A SIGNAL
      SUBROUTINE PEAKVL(S,N,PEAK)
      DIMENSION S(N)
      PEAK = -1.0E + 37
      DO 1I = 1,N
      IF (ABS)S(I)).LE.PEAK) GO TO 1
      PEAK = ABS(S(I))
1     CONTINUE
      RETURN
      END
```

I claim:

1. A predictive signal [communication] *processing* system comprising means for analyzing an input signal in successive time intervals to generate a set of prediction signals for each interval;

means jointly responsive to the input signal and the interval prediction signals for producing a predictive residual signal;

means for generating a quantized signal corresponding to said predictive residual signal;

and means for encoding said quantized signal;

characterized in that said quantized signal generating means (160, 164, 166, 111, 168) comprises means (160) responsive to [said interval prediction signals,] said predictive residual signal and said quantized signal for producing an adaptively varying threshold level signal, means (164) responsive to said adaptively varying threshold level signal for dividing said predictive residual signal into a first distinct portion below said threshold level signal and a second distinct portion at and above said threshold level signal, and means (111) responsive to said first and second distinct portions for producing first and second sets respectively of quantized signals.

2. A predictive signal [communication] *processing* system according to claim 1 further characterized in that said input signal is a speech signal.

3. A predictive signal [communication] *processing* system according to claim 2 further characterized in that said dividing means (164) is a center clipper adapted to produce a first value signal responsive to said portion below said threshold level signal and a set of second value signals responsive to said portion at and above said threshold level signal.

4. A method for processing a predictive type signal [in a communication arragement] comprising the steps of:

analyzing an input signal in successive time intervals to generate a set of prediction signals for each interval;

producing a predictive residual signal jointly responsive to said input signal and the interval prediction signals;

generating a quantized signal corresponding to the predictive residual signal;

and encoding the quantized signal;

characterized in that the generation of said quantized signal comprises producing an adaptively varying threshold level signal responsive to [said interval prediction signals,] said predictive residual signal and said quantized signal, dividing said predictive residual signal into a first distinct portion below said threshold level signal and a second distinct portion at and above said threshold level signal responsive to said adaptively varying threshold level signal, and producing first and second sets of quantized signals responsive to said first and second distinct portions respectively.

5. A method of processing a predictive type signal [in a communication system] according to claim [8] *4* characterized in that said input signal is a speech signal.

6. A method for processing a predictive type signal [in a communication system] according to claim 5 further characterized in that said [partitioning] *dividing* step comprises center clipping said signal to produce a first value signal responsive to the predictive residual signal portion below said threshold level signal and a set of second value signals responsive to the portion at and above said threshold value signal.

7. A method for processing a predictive type signal [in a communication system] according to claim 6 further characterized in that said adaptively varying threshold level signal is produced jointly responsive to [said prediction signals,] said predictive residual signal, and said quantized signal in accordance with the predetermined relationship $$\theta_n = \theta_0\left[\left(\frac{100}{\gamma}\,|\overline{Q\theta_n}|\right)\,(|\overline{QI_n}|/|\overline{v_n}|)\right]^{\frac{1}{2}}$$

where $\theta_0$ represents the interval prediction signal determined threshold level signal $Q\theta_n$ represents the quantized signal $QI_n$ represents the signal just prior to center clipping $v_n$ represents the predictive residual signal and $\gamma$ represents the percentage of first value $Q\theta_n$.

8. A method for processing a predictive type signal [in a communication system] according to claim 7 further characterized in that said first value signal is a zero valued signal and said second value signals are uniform step-size quantized signals above said threshold level signal.

9. A predictive signal [communication] *processing* system according to claim 2 further characterized in that said threshold level signal producing means (160) produces a threshold level signal $\theta_n$ in accordance with the predetermined relationship $$\theta_n = \theta_0\left[\left(\frac{100}{\gamma}\,|\overline{Q\theta_n}|\right)\,(|\overline{QI_n}|/|\overline{v_n}|)\right]^{\frac{1}{2}}$$

where $\theta_0$ represents the interval predictive signal determined threshold level signal $Q\theta_n$ represents the quantized signal $QI_n$ represents the signal at the input of said center clipping means $v_n$ represents the predictive residual signal and $\gamma$ represents the percentage of first value $Q\theta_n$.

10. A predictive signal [communication] *processing* system according to claim 9 further characterized in that said first value signal is a zero valued signal and said second value signals are uniform step-size quantized signals.

* * * * *